Jan. 17, 1933.  P. D. HARTOG  1,894,741
PORTABLE FAUCET
Filed Oct. 11, 1930
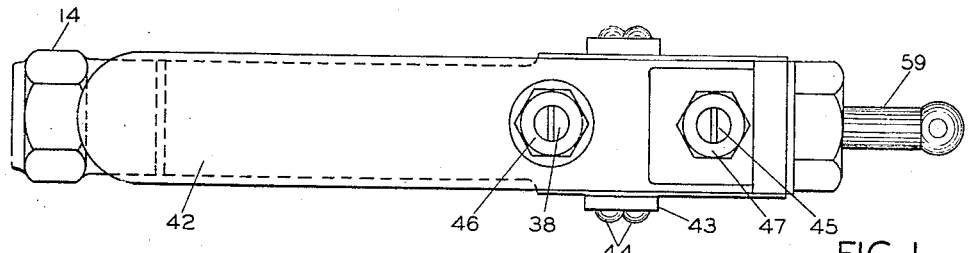
FIG. 1
FIG. 2
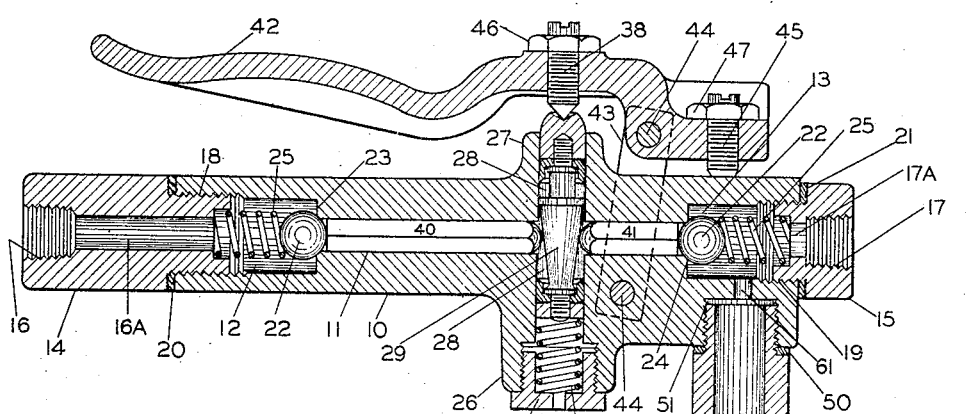
FIG. 5  FIG. 3
 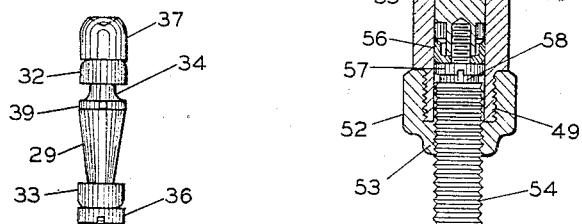
FIG. 6  FIG. 4
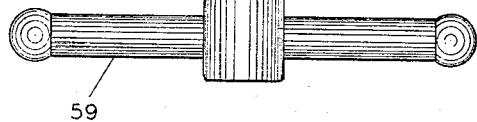
Inventor
Paul D. Hartog
By Wm. L. Symons
his attorney Patented Jan. 17, 1933

1,894,741

UNITED STATES PATENT OFFICE

PAUL D. HARTOG, OF LONG ISLAND CITY, NEW YORK

PORTABLE FAUCET

Application filed October 11, 1930. Serial No. 488,135.

This invention relates to fluid faucets, more particularly, to portable fluid faucets adapted for use in dispensing fluids such as oil, grease, and lubricating compounds.

The objective provisions of this invention are:

One: To provide a faucet for accurate and economical control of the fluid dispensed.

Two: To provide a faucet in which vibration of its structural parts is eliminated and the wearing of the operative parts thereby minimized.

Three: To provide a faucet convenient for manipulation, of minimum weight, and economical in construction.

Four: To provide a faucet in which the discharge fluid is prevented from reentering the port from which the fluid has been discharged.

Five: To provide a faucet in which the fluid is prevented from entering into the passage-way port of the faucet by any pressure other than the pressure employed in operating the valves of the faucet.

Six: To provide a faucet in which the admitted and discharged fluid has passage-way through a straight line port, thereby minimizing frictional resistance.

Further objects of this invention will become obvious as of the detailed description here given and which will also enable others skilled in the art to which this invention relates to understand, make, and use the same when read in connection with the accompanying drawing, in which—

Fig. 1 is a plan view;

Fig. 2 is a sectional view thereof;

Fig. 3 is a view in elevation of a piston member in assembly with parts of this construction.

Fig. 4 is an end view of the piston;

Fig. 5 is a view in elevation of a push bar member part of this construction; and Fig. 6 is an end view of the push bar.

The structural parts of this invention are designated numerically, understanding that like parts will be designated by like numerals, in the order of which numeral 10 designates that part of the construction denominated the body, and in which there is provided a longitudinal fluid passage-way port 11 terminating in chambered end portions 12 and 13 formed within the body 10.

The portion 12 and 13, for the purpose of localizing, will be termed throughout this specification as admission end portion and the discharge end portion which portions are threaded part-way of their length to receive threaded connector couplings 14 and 15 having pipe threaded apertures 16 and 17 and which also are provided with apertures 16ª and 17ª which coincide approximately with the size of the port 11 and align therewith. Between the respective surfaces at the end of the body 10 and intervening the surfaces formed on the threaded ends 18 and 19 of the connector couplings 14 and 15 are leak sealing gaskets 20 and 21.

Within the admission end chamber 12 and the discharge end chamber 13 are ball seated check valves 22, having their seat within the port 11 and upon the face edge surface of the counter-bored portion 12 and 13 of the chambers. Supporting tensionally and forwardly pressing the ball seated check valves 22 are extension pressure springs 25, a seat for which is provided in a counter-bored portion formed within the threaded end 18 and 19 of the connector couplings 14 and 15, thereby securing the springs from lateral dislocation.

Formed on the body 10 are boss projecting portions 26 and 27, and within which bosses there is a cylindrically bored hole 28 which provides a transverse cylinder within the body 10, the localized position of which lies between the respective pressure close check valves 22. Mounted for reciprocal operative movement within the cylinder is a piston 29. Supporting the piston is an extension pressure spring 30 seated within a counter-bored opening formed in the threaded portion of the plug 31, which is screwed into the threaded boss 26. The piston 29, therefore, is at all times suspended elevatedly in a tensionally yielding independent position, excepting when operated upon, which will be described later.

Referring to Fig. 3 the piston is illustrated in elevation in assembly with cylinder sealing cup leathers 32 and 33 which are mounted upon shouldered stud portions 34 and 35 formed on the piston, the ends of the shouldered stud portions being threaded and to which are screwed binding nuts 36 and 37. The top surface of the nut 37 is provided with a conical concavity for the purpose of forming a bearing seat for the conical end of the screw 38 Fig. 2.

The piston 29 has a narrow portion 39 which is fitted slidably to the cylinder bore and a comparatively large portion of the contour of the piston being tapered which provides an inclined plane surface which has slidable contact with the check valve opening push bars 40 and 41 which are located operatively within the port 11 of the body 10.

The push bars 40 and 41 are operatively in contact engagement with the ball seated check valve 22, but so adjustable that a small predetermined gap is provided between the balls 22 and the tapered body 29 of the piston, the purpose of which is to prevent the balls from being pressed away from their seat while normally at rest.

Connected to the body 10 is an operating lever 42, connected thereto by means of metal straps 43 which operate on pivot pins 44, fitted into drilled holes in the body 10 and bearing holes in the straps 43. The operating lever 42 is adjustable upon the body 10 by means of screws 38 and 45, which are provided with nuts 46 and 47, so as to lock the screws in position when proper adjustment is attained. The lever 42 requires careful adjustment in order that the movement of the lever on its pivot bearings be such that when the lever is pressed downwardly the pressure transmitted to the piston 29 be maintained comparatively perpendicular to avoid side thrusting of the piston and undue friction thereon.

For the purpose of increasing the pressure of the fluid when discharged from the faucet to the place of reception, and in the absence of a sufficiently high normal pressure to convey the fluid to the desired place, superinducing pressure means is connected to the body 10, comprising in its construction the well known elements of a common hand force pump, employing as a cylinder thereof a tubular body 48, which is threaded at its respective ends 49 and 50, the threaded end at 50 being screwed into a threaded hole 51 provided in the body 10, the location of which is of measurable importance inasmuch as it is back of the ball seated check valve 22 located at the discharge end of the faucet. It is obvious that any pressure at this position will impel the ball check valve 22 to a tighter seating and thereby preclude the return of the discharged fluid to the port from which it has been emitted.

Upon the end of the tubular body 49 a cap 52 is screwed to the threaded end thereof, the cap having a threaded aperture 53 adapted to receive a threaded screw plunger 54, at the pressure end of which 58 a piston 55 is closely fitted within the cylinder 60, and upon the non-contacting fluid pressure face of the piston 55 there is a cylinder sealing cup leather 56 atttached to the piston 55 by means of a cap screw 57, the flat surface upon the head of the screw 57 having contact bearing against the face on the flat surface 58 at the end of the screw plunger 54. It is apparent that when the screw plunger 54 is turned in a right hand direction by means of the lever handle 59, the piston is impelled forward from its elevated position to a descended position within the cylinder, in consequence of which the fluid within the cylinder 60 is forced outwardly through the aperture 61 and through the discharged end of the faucet together with the fluid remaining in the connector pipe line. The plunger 54 upon being retracted to its former elevated position, permits the piston to be forced in like manner by the fluid passing through the discharge end of the faucet.

In the practical operation of the faucet when connected at 16 to a source of fluid supply, the admission of the fluid into and through the port 11 is effected by pressing downwardly the operating lever 42 which imparts a movement downward of the piston 29, the piston in turn imparting a forward movement to the push bars 40 and 41, the forward movement of the bars effecting a displacement of the ball seated check valves pushing them from off their seats thereby permitting the influx of fluid into and through the port 11. The push bars 40 and 41 more preferably, are of a square cross-section, hence, an adequate opening remains between the circular form of the port 11 and the flat surfaces upon the square cross-section of the push bars and through which opening the fluid can freely pass.

Having thus described the invention, I desire to secure by Letters Patent of the United States of America this, my invention, which I claim is:

1. A portable faucet comprising a body provided with a longitudinal port within and through said body, check valve fluid restraining means within said port, a transverse cylinder on said body integral therewith and positioned between said check valve fluid restraining means, a member operative within said transverse cylinder to actuate said check valve fluid restraining means, and an operative lever mounted on said cylinder and having operative engagements with the said member within said cylinder.

2. A portable faucet comprising a body provided with a longitudinal port within and through said body, a pair of simultaneous pressure close check valves within said port, a transverse cylinder on and integral with said body, a member operative longitudinally within said transverse cylinder having operative engagement with means for simultaneously opening the previously mentioned check valves and a lever connected to said body and operative upon the member within said cylinder.

3. A portable faucet comprising a body, a longitudinal port within and through said body provided with chambered end portions constituting fluid admission and discharge portions, simultaneous pressure close check valves within said portion, a transverse cylinder integral with said body and positioned between the admission and discharge portions, a member operative longitudinally within said transverse cylinder, means engaging said member within said cylinder, and a lever operatively connected to said body and supported in normal operative position by the said member within said cylinder, whereby said simultaneous pressure close check valves are simultaneously open for the admission and the discharge of fluid through said longitudinal port within said body.

4. A portable faucet comprising a body provided with a longitudinal port within and through said body, check valve fluid restraining means within said port, a transverse cylinder on said body integral therewith and positioned between said check valve fluid restraining means, a member operative within said transverse cylinder having operative engagement with means for actuating said check valve fluid restraining means, an operative lever mounted on said cylinder and having operative engagement with the said member within said cylinder, and an auxiliary pressure inducing means mounted upon and adjacent the end portion of said body.

5. In a portable faucet the combination of a body provided with a longitudinal port within and through said body, admission end portions and a discharge end portion within said body, simultaneous pressure close check valves within the previously mentioned respective portions, a transverse cylinder formed upon and integral with said body and positioned between the previously mentioned respective check valves, a member operative longitudinally within said transverse cylinder, check valve push bars within said longitudinal port, a lever mounted on said body for operative engagement with and supported in normally operative position by said member in said transverse cylinder, said member in said cylinder being operatively engaged with said previously mentioned check valve push bars, whereby said simultaneous pressure close check valves are simultaneously opened for the admission and discharge of fluid through the longitudinal port within said body.

6. A portable faucet having in combination a body provided with a longitudinal port within and through said body, said body provided with a fluid admission portion and a fluid discharge portion, simultaneous pressure close check valves within the respective portions adapted to preclude the influx of fluid into the port sealed by said check valves, a transverse cylinder on and integral with said body, said transverse cylinder being positioned between the previously mentioned respective check valves, a member operative within said cylinder, means having engagement with said member in said cylinder and a lever, said lever mounted and operative on said body, whereby said simultaneous pressure close check valves are simultaneously opened for the admission and discharge of fluid through said longitudinal port within said body, and means on said body for superinducing the pressure of the discharged fluid from the discharge portion of said body.

7. A portable faucet comprising a body provided with a longitudinal port within and through said body, an admission end portion and a discharge end portion within said body, simultaneous pressure close check valves within the previously mentioned respective portions, a transverse cylinder on said body and positioned between the previously mentioned respective check valves, a member operative within said transverse cylinder, check valve push bars within said longitudinal port, a lever mounted on said body for operative engagement with and supported in a normally operative position by said member in said transverse cylinder, said member in said cylinder having operative engagement with said previously mentioned check valve push bars, whereby said simultaneous pressure close check valves are simultaneously opened for the admission and discharge of fluid through said longitudinal port within said body, a connector coupling in said admission end portion and said discharge end portion of said body adapted for connectable engagement with a portable supply pipe and discharge pipe for said body and means on said body adjacent the discharge end thereof for superinducing the pressure of the fluid discharged from said body.

8. A portable faucet comprising a body provided with a longitudinal cylindrical port therein, check valves spaced in said bore, a transverse cylinder arranged in said body between said check valves, check valve operating bars slidably arranged in said bore and extending into said transverse cylinder, and a cam slidable longitudinally in said transverse cylinder and adapted to engage the valve operating bars to operate the check valves.

In testimony whereof I affix my signature.
PAUL D. HARTOG.